(12) United States Patent
Kim et al.

(10) Patent No.: US 11,377,395 B2
(45) Date of Patent: Jul. 5, 2022

(54) CONTROLLED-RELEASE TYPE FERTILIZER WITH DECREASED FLOATING PROPERTY COMPRISING POLYOXYETHYLENE ALKY(-ARYL) ETHER AND METHOD FOR PREPARING THE SAME

(71) Applicant: LG CHEM, LTD., Seoul (KR)

(72) Inventors: Mihee Kim, Daejeon (KR); Hyo Sook Joo, Daejeon (KR); Eun Kyoung Park, Daejeon (KR); Hyeon Choi, Daejeon (KR); Ki Youl Yoon, Daejeon (KR); Joon Seok Lee, Ulsan (KR)

(73) Assignee: LG CHEM, LTD., Seoul (KR)

( * ) Notice: Subject to any disclaimer, the term of this patent is extended or adjusted under 35 U.S.C. 154(b) by 45 days.

(21) Appl. No.: 16/646,951

(22) PCT Filed: Sep. 13, 2018

(86) PCT No.: PCT/KR2018/010753
§ 371 (c)(1),
(2) Date: Mar. 12, 2020

(87) PCT Pub. No.: WO2019/054772
PCT Pub. Date: Mar. 21, 2019

(65) Prior Publication Data
US 2020/0270185 A1 Aug. 27, 2020

(30) Foreign Application Priority Data
Sep. 13, 2017 (KR) .................... 10-2017-0117391

(51) Int. Cl.
*C05G 5/30* (2020.01)
*C05G 5/12* (2020.01)
*C05G 3/50* (2020.01)

(52) U.S. Cl.
CPC .............. *C05G 5/37* (2020.02); *C05G 3/50* (2020.02); *C05G 5/12* (2020.02)

(58) Field of Classification Search
None
See application file for complete search history.

(56) References Cited

U.S. PATENT DOCUMENTS

| | | | | |
|---|---|---|---|---|
| 4,019,890 A * | 4/1977 | Fujita | ................. | B01J 2/006 71/64.11 |
| 4,369,055 A * | 1/1983 | Fujita | ................. | B01J 2/30 71/64.11 |
| 4,988,377 A * | 1/1991 | Manalastas | ......... | C05G 5/37 71/28 |
| 5,133,797 A * | 7/1992 | Mahara | ............ | C05G 5/37 71/28 |
| 5,147,442 A | 9/1992 | Kosuge et al. | | |
| 5,176,734 A * | 1/1993 | Fujita | ................. | C05G 5/37 71/11 |
| 5,429,654 A * | 7/1995 | Swarup | ............. | C05G 5/37 71/64.07 |
| 6,500,223 B1 | 12/2002 | Sakai et al. | | |
| 8,211,474 B2 * | 7/2012 | Watanabe | ......... | C08G 18/282 424/497 |
| 2003/0157247 A1 * | 8/2003 | Chikami | .......... | B01J 2/006 427/212 |
| 2006/0141010 A1 * | 6/2006 | Karl | ................. | C05G 5/37 424/442 |
| 2007/0072775 A1 * | 3/2007 | van Boxtel-Verhoeven | ........ | A01N 57/12 504/367 |
| 2012/0090366 A1 * | 4/2012 | Pursell | ............. | C05G 5/37 71/28 |
| 2016/0340266 A1 * | 11/2016 | Jablon | ............. | C05G 5/37 |

FOREIGN PATENT DOCUMENTS

| | | |
|---|---|---|
| CN | 104926532 A | 9/2015 |
| CN | 105636922 A | 6/2016 |
| JP | S56-005394 A | 1/1981 |
| JP | S56-092188 A | 7/1981 |
| JP | S56-120597 A | 9/1981 |
| JP | H10-167868 A | 6/1998 |
| JP | H10-203886 A | 8/1998 |
| JP | H10-236895 A | 9/1998 |
| JP | H11-071192 A | 3/1999 |
| JP | H11-092261 A | 4/1999 |
| JP | 2001-031489 A | 2/2001 |
| JP | 2001-515837 A | 9/2001 |
| JP | 2003-081705 A | 3/2003 |
| JP | 2004-075479 A | 3/2004 |
| JP | 2005-041700 A | 2/2005 |
| JP | 2005-324981 A | 11/2005 |
| JP | 2009-242195 A | 10/2009 |
| JP | 2017-081777 A | 5/2017 |
| KR | 1996-0015151 B | 11/1996 |
| KR | 10-1410859 B1 | 7/2014 |
| WO | 2011-152533 A | 12/2011 |

OTHER PUBLICATIONS

Search Report issued for International Application No. PCT/KR2018/010753 dated Jan. 8, 20219, 4 pages.
Handbook of Analytical Chemistry, Chemical Industry Press, Beijing, Dec. 1997, with English translation, 6 pages.

* cited by examiner

*Primary Examiner* — Wayne A Langel
(74) *Attorney, Agent, or Firm* — Rothwell, Figg, Ernst & Manbeck, P.C.

(57) ABSTRACT

The present invention relates to a controlled-release type fertilizer with remarkably decreased floating property, comprising a granular fertilizer core; a coating layer (shell) formed on the surface of the granular fertilizer core, and comprising olefin-based resin; and additives attached on the coating layer, and comprising polyoxyethylene alkyl(-aryl) ether.

11 Claims, No Drawings

CONTROLLED-RELEASE TYPE FERTILIZER WITH DECREASED FLOATING PROPERTY COMPRISING POLYOXYETHYLENE ALKY(-ARYL) ETHER AND METHOD FOR PREPARING THE SAME

CROSS-REFERENCE TO RELATED APPLICATION

This application is a 35 U.S.C. 371 National Phase Entry Application from PCT/KR2018/010753, filed on Sep. 13, 2018, designating the United States and which claims the benefit of Korean Patent Application No. 10-2017-0117391 filed on Sep. 13, 2017 with the Korean Intellectual Property Office, the disclosures of which are herein incorporated by reference in their entirety.

TECHNICAL FIELD

The present invention relates to a controlled-release type fertilizer with decreased floating property, and a method for preparing the same. More specifically, the present invention relates to a controlled-release type fertilizer wherein the floating property of the existing controlled-release type fertilizer is decreased by short and simple mixing, and a method for preparing the same.

BACKGROUND ART

With the purpose of laborsaving of fertilization or manifestation of the effect of fertilizer according to the growth and development of plants, various controlled-release type fertilizers have been developed.

Representative controlled-release type fertilizer includes a coated fertilizer of which surface is coated with various resins or inorganic substances, and for example, the coated fertilizer means a fertilizer wherein the velocity of dissolution of fertilizer components is controlled by coating the surface of a common quick acting fertilizer with specific polymer resins such as acryl resin, polyurethane, polyolefin resin, etc. to a certain thickness, and thus, during the whole growth and development period of crops, fertilizer components are slowly released in necessary amount. Since the coated granular fertilizer can last fertilizer efficiency during the whole growth and development period of crops, the number of fertilization is reduced and fertilization labor force is reduced, and the fertilizer use efficiency of crops is increased to the maximum, thus reducing the pollution of river or underground water by fertilizer nutrients, and thus, it is considered as being the best fertilizer among the fertilizers developed so far. However, the coating of such a controlled-release type fertilizer mostly consist of resin lacking hydrophilicity, and thus, a problem of floating of the fertilizer in rain or water during fertilization has been raised.

In order to solve the problem, in the prior art, technologies of preventing floating by attaching additives such as hydrophilic surfactant, anionic surfactant, etc. or inorganic powder such as $SiO_2$, etc. on the fertilizer surface were developed.

However, inorganic powder may not be sufficiently attached to the fertilizer surface and the powder may take off during the process or when using the fertilizer.

BRIEF SUMMARY OF THE INVENTION

The present invention provides a controlled-release type fertilizer that fulfills release controllability and productivity required in a controlled-release type fertilizer, and simultaneously, has decreased floating property in that a fertilizer hardly floats after fertilization.

One aspect of the present invention relates to a controlled-release type fertilizer comprising a granular fertilizer core; a coating layer (shell) formed on the surface of the granular fertilizer core, and comprising olefin-based resin; and additives attached on the coating layer, and comprising polyoxyethylene alkyl(-aryl)ether.

Another aspect of the present invention relates to a method for preparing a controlled-release type fertilizer having additives comprising the polyoxyethylene alkyl(-aryl)ether.

Advantageous Effects

The controlled-release type fertilizer according to the present invention remarkably decreases floating property that becomes a problem in the existing controlled-release type fertilizer, thereby preventing floating on the water surface after fertilization, and remarkably reducing the amount of dust generation.

DETAILED DESCRIPTION OF THE EMBODIMENTS

Hereinafter, the embodiments of the present invention will be explained in detail.

Specifically, the controlled-release type fertilizer according to the present invention comprises a coating layer comprising olefin-based resin, and an additive attachment layer comprising polyoxyethylene alkyl(-aryl)ether, sequentially on the surface of a granular fertilizer core.

In the present invention, the fertilizer may be various known fertilizers, for example, urea or a compound fertilizer.

The olefin-based resin, although not limited hereto, may be polyolefin or copolymer of olefin and ethylene vinyl acetate. Preferably, the polyolefin may be high density or low density polyethylene, polypropylene, ethylene-propylene copolymer, polybutene, butene-ethylene copolymer, butene-propylene copolymer. In the present invention, the ethylene vinyl acetate copolymer is copolymer comprising ethylene and vinyl acetate, and the content and molecular weight of the vinyl acetate are not specifically limited.

According to preferable embodiment, the weight ratio of the coating layer comprising olefin-based resin is 1 to 20 wt %, preferably 2 to 15 wt %, based on the total weight of the fertilizer. According to specific embodiment, the olefin-based resin is coated on the granular fertilizer core to form a film(shell), and thus, the fertilizer is included in the film.

In the present invention, on the surface of a fertilizer wherein a granular fertilizer core is included in the film comprising olefin-based resin, additives comprising polyoxyethylene alkyl(-aryl)ether are further coated as surfactant. The polyoxyethylene alkyl(-aryl)ether means a structure wherein alkylether or alkyl aryl ether is connected to polyoxyethylene, and the weight average molecular weight of the alkyl or alkylaryl groups corresponding to hydrophobic groups of such polyoxyethylene alkyl(-aryl)ether is preferably 50 to 300. If the weight average molecular weight of the hydrophobic groups is less than 50, since the carbon number of the hydrophobic groups is equal to or less than 4, it is difficult to exhibit the property of a surfactant. And, since the additive wherein the weight average molecular weight of hydrophobic groups is greater than 300 is in the form of solid, it is difficult to effectively attach. And, it is preferable that the weight ratio of the hydrophobic groups are 30 to 70 wt %, based on the total weight of polyoxyethylene alkyl(-aryl)ether.

And, according to specific embodiment, the additives may comprise ethyleneoxide (EO) as hydrophilic groups, and it is preferable that the weight ratio of such EO is 30 to 70 wt %, based on the total weight of polyoxyethylene alkyl(-aryl)ether. The weight average molecular weight of the hydrophilic groups may be 100 to 1000. If the rate of ethyleneoxide (EO) is less than 30 wt %, affinity with water may be weak, and thus, the effect for inhibiting the floating property of a granular fertilizer may be rather lowered. And, if the rate of EO of ethyleneoxide (EO) is greater than 70 wt %, the affinity with water may be higher than the attachment force to the hydrophobic fertilizer surface, and thus, the floating property decrease effect may be low.

And, the amount of the polyoxyethylene alkyl(-aryl)ether is 0.001 wt % to 0.5 wt %, based on the total weight of the controlled-release type fertilizer. And, if it is less than 0.001 wt %, the amount is not sufficient, and the additive may not be sufficiently attached on the fertilizer surface, and thus, floating prevention performance may be lowered, and if it is introduced in an amount greater than 0.5 wt %, although floating property is decreased, since the surfactant itself is relatively expensive, it may cause cost increase.

According to preferable embodiment, in order to more efficiently decrease the floating property of a controlled-release type fertilizer, the additive coating layer may further comprise inorganic powder. Such inorganic powder may be preferably hydrophilic inorganic powder having hydroxyl groups on the surface, and more preferably, precipitated silica. In the specific examples according to the present invention, Sipernat 22S of Evonik company was used. Preferably, the inorganic powder has a specific surface area of 100 $m^2$/g to 500 $m^2$/g, and particle size of 1 μm to 500 μm. If the specific surface area of the inorganic powder is less than 100 $m^2$/g, the hydrophilic part exposed on the surface may not be sufficient, and thus, affinity with water may be low and the floating property decrease effect may be lowered, and if it is greater than 500 $m^2$/g, specific gravity is generally low, thus causing process difficulty. If the particle size is less than 1 μm, fine powder may be blown, and thus, the processibility may be lowered, and if the particle size is greater than 100 μm, it may be difficult to sufficiently attach on the fertilizer surface. The amount of the inorganic powder is preferably 0.01 wt % to 1 wt %, based on the total weight of the controlled-release type fertilizer. And, if it is less than 0.01 wt %, the amount is not sufficient, and thus, affinity with water may be lowered, and floating property decrease effect may be low, and if it is greater than 1 wt %, although floating property is decreased, continuous detaching of the inorganic powder that is attached beyond necessary may occur, and thus, process dust may be blown, or failure in the fertilization machine may be caused.

According to preferable embodiment, the controlled-release type fertilizer of the present invention comprises liquid additives attached on the surface, comprising the polyoxyethylene alkyl(-aryl)ether and/or the inorganic powder. If the additive is liquid, mixability is very good, and thus, may be uniformly attached to the granular fertilizer even by simple mixing, thus remarkably decreasing floating property.

According to another aspect, the present invention relates to a method for preparing a controlled-release type fertilizer, comprising the steps of:

i) coating the surface of a granular fertilizer core with a coating composition comprising olefin-based resin to form a first coating layer; and ii) coating the first coating layer with additives comprising polyoxyethylene alkyl(-aryl)ether.

In the preparation method of the present invention, the steps i) and ii) may be conducted by known coating methods without specific limitations. Preferably, the additives used in step ii) are liquid, and may further comprise inorganic powder.

In the present invention, a controlled-release type fertilizer with decreased floating property can be prepared within a short time by a common simple mixing method.

Hereinafter, the present invention will be explained in detail through Examples and Experimental Examples, but these Examples and Experimental Examples are presented only as the illustration of the present invention, and the scope of the present invention is not limited thereby.

Examples 1 to 10 and Comparative Examples 1 to 4: Preparation of Controlled-Release Type Fertilizer In order to confirm floating properties according to the compositions of controlled-release type fertilizers, controlled-release type fertilizers were prepared using the additives and inorganic powders corresponding to the conditions of the following Table 1.

TABLE 1

| | Additive | Property of additive | Amount of additive (wt %) | Weight ratio of EO in additive (%) | Weight Average Molecular weight of hydrophobic group in additive | Inorganic powder | Specific surface area of inorganic powder ($m^2$/g) | Amount of inorganic powder (wt %) | mixability | Floating rate (%) |
|---|---|---|---|---|---|---|---|---|---|---|
| Example 1 | Brij L4 | Liquid | 0.05 | 49 | 186 | — | — | — | ○ | 0 |
| Example 2 | IGEPAL CA-520 | Liquid | 0.05 | 52 | 207 | — | — | — | ○ | 0 |
| Example 3 | IGEPAL CO-520 | Liquid | 0.05 | 50 | 221 | — | — | — | ○ | 0 |
| Example 4 | IGEPAL CO-630 | Liquid | 0.05 | 64 | 221 | — | — | — | ○ | 4 |
| Example 5 | Brij O10 | Liquid | 0.05 | 62 | 269 | — | — | — | ○ | 10 |
| Example 6 | IGEPAL CO-720 | Liquid | 0.05 | 70 | 222 | — | — | — | ○ | 8 |
| Example 7 | Brij L4 | Liquid | 0.001 | 49 | 186 | — | — | — | ○ | 5 |
| Example 8 | Brij L4 | Liquid | 0.001 | 49 | 186 | — | — | — | ○ | 19 |
| Example 9 | Brij L4 | Liquid | 0.001 | 49 | 186 | Sipernat 22S | 190 | 0.1 | ○ | 0 |

TABLE 1-continued

| | Additive | Property of additive | Amount of additive (wt %) | Weight ratio of EO in additive (%) | Weight Average Molecular weight of hydrophobic group in additive | Inorganic powder | Specific surface area of inorganic powder (m²/g) | Amount of inorganic powder (wt %) | mixability | Floating rate (%) |
|---|---|---|---|---|---|---|---|---|---|---|
| Example 10 | IGEPAL CO-630 | Liquid | 0.001 | 64 | 221 | Sipernat 22S | 190 | 0.1 | ○ | 0 |
| Comparative Example 1 | None | — | 0 | — | — | — | — | — | — | 100 |
| Comparative Example 2 | IGEPAL DM-970 | Solid | 0.05 | 95 | 355 | — | — | — | x | 100 |
| Comparative Example 3 | Lutensol AT 25 | Solid | 0.05 | 81 | 260 | — | — | — | x | 100 |
| Comparative Example 4 | Brij C2 | Solid | 0.05 | 27 | 242 | | | | x | 100 |

Specifically, first, a granular fertilizer coated with olefin-based resin was prepared using a fluidized bed type preparation apparatus. Specifically, hot air was applied at the lower part of the fluidized bed type preparation apparatus to make the fertilizer particles float in the air flow, and then, a coating solution was sprayed through an inlet installed on the side. The above process was conducted until the final coating amount became 10 wt %, and the solvent was condensed and recovered through a condenser. After the spraying of the solution was finished, only hot air was sprayed to dry, thus preparing a granular fertilizer having a coating layer comprising olefin-based resin. 45 g of the granular fertilizer having a particle diameter of about 4 mm, prepared as described above, was filled in a 70 ml vial, and then, the additive (surfactant) described in Table 1 was introduced in the amount of 0.001 to 0.05 wt %, based on the total weight of the fertilizer, and in Examples 9 and 10 the inorganic powder was introduced in the amount of 0.1 wt %, based on the total weight of the fertilizer. They were mixed for 1 minute on a roller mixer rotating at 60 rpm to prepare a controlled-release type fertilizer.

Experimental Example 1: Examination of the Floating Property of Controlled-Release Type Fertilizer In order to examine the floating properties of the controlled-release type fertilizers prepared according to Examples 1 to 10 and Comparative Examples 1 to 4, the floating rates were measured. Specifically, about 300 coated fertilizers were spread in a 600 ml beaker so as not to overlap, and then, 50 ml of water was slowly introduced along the wall surface of the beaker. The floating rate was calculated as the percentage of the number of particles floated on the water surface after the introduction of water, compared to the total number of particles. If the floating rate is less than 100%, it was judged that there is floating prevention effect, and the calculated floating rates were shown in Table 1.

Specifically, as the result of confirming the floating properties of Examples 1 to 10 and Comparative Examples 1 to 4, the followings are confirmed.

1) In case the property of the additive is liquid, mixability was very good, and thus, it was uniformly attached to the granular fertilizer only by 60 rpm roller mixing for 1 minute. As the result, when the additive was introduced in the amount of 0.05 wt %, the effect for decreasing the floating property of the fertilizer was exhibited.

2) Examples 1 to 8 used the additives wherein the rate of EO is 30 wt % or more and 70 wt % or less, and the weight average molecular weight of hydrophobic groups is 50~300. When these additives were introduced in the amount of 0.05 wt %, the effect for decreasing the floating property was confirmed.

3) In Examples 3, 4 and 6, the weight average molecular weight of the hydrophobic groups is identical, and the EO rate increases in the order. As the EO rate increases, the attachment force to the granular fertilizer surface becomes weak and the floating property increases. Thus, the EO rate of 45 wt % or more and 65 wt % or less is most preferable.

4) As can be seen from the result of Example 8, in case the amount of the additives used is less than 0.001 wt %, the additives were not uniformly attached to the whole granular fertilizer, and thus, the floating prevention effect decreased. Thus, it is most preferable that the additives are introduced in an amount of 0.001 wt %, based on the total weight of the fertilizer.

5) As shown in Examples 9 and 10, when 0.001 wt % of additive and 0.1 wt % of inorganic powder are introduced and mixed by the same method, floating property is further decreased, compared to using additive alone.

6) In the case of Comparative Example 1 wherein additive is not introduced, the floating rate was 100%.

7) In Comparative Examples 2 to 4 wherein the property of the additive is solid, mixability was not good, and thus, the additive was not uniformly attached to the granular fertilizers by 60 rpm roller mixing for 1 minute. As the result, when the additive was introduced in the amount of 0.05 wt %, the floating rate of the fertilizer was 100%, and thus, the floating property was not decreased at all.

8) In general, surfactants of polyoxyethylene alkyl (or alkylaryl) ether structures, wherein the weight average molecular weight of hydrophobic groups is 300 or more, are not common. This is because the necessity for an alkyl chain having a carbon number of 20 or more is not high in the surfactants that are not in the form of block copolymer. And, in case the weight average molecular weight of hydrophobic groups is 300 or more, as shown in Comparative Example 2, the surfactant is probably in the form of solid, which is not preferable in the mixing method used in the present invention.

As explained above, in the present invention, polyoxyethylene alkyl(-aryl)ether having characteristic properties is attached to and coated on a granular fertilizer, thereby exhibiting excellent floating property decrease effect.

The invention claimed is:

1. A controlled-release type fertilizer comprising;
a granular fertilizer core;
a coating layer formed on the surface of the granular fertilizer core, the coating layer comprising an olefin-based resin; and
additives attached on the coating layer, the additives comprising a polyoxyethylene alkyl(-aryl)ether, wherein the polyoxyethylene alkyl(-aryl)ether includes hydrophilic groups in an amount of 30 to 70 wt %, based on the total weight of the polyoxyethylene alkyl(-aryl)ether, and the controlled-release type fertilizer comprises the additives in an amount of 0.001 wt % to 0.05 wt %, based on the total weight of the controlled-release type fertilizer,
wherein the polyoxyethylene alkyl(-aryl)ether includes hydrophobic groups in an amount of 30 to 70 wt %, based on the total weight of polyoxyethylene alkyl(-aryl)ether, and
wherein the hydrophobic groups in the polyoxyethylene alkyl(-aryl)ether have a weight average molecular weight of 50 to 300.

2. The controlled-release type fertilizer according to claim 1, wherein the additives further comprise inorganic powder.

3. The controlled-release type fertilizer according to claim 2, wherein the inorganic powder has a specific surface area of 100 $m^2$/g to 500 $m^2$/g.

4. The controlled-release type fertilizer according to claim 2, wherein the inorganic powder has a particle size of 1/1111 to 500/1111.

5. The controlled-release type fertilizer according to claim 2, wherein the inorganic powder is hydrophilic inorganic powder having a hydroxyl group.

6. The controlled-release type fertilizer according to claim 2, wherein the inorganic powder is included in an amount of 0.01 wt % to 1 wt %, based on the total weight of the controlled-release type fertilizer.

7. The controlled-release type fertilizer according to claim 1, wherein the olefin-based resin is polyolefin or a copolymer of olefin and ethylene vinyl acetate.

8. The controlled-release type fertilizer according to claim 1, wherein the hydrophilic groups in the polyoxyethylene alkyl(-aryl)ether have a weight average molecular weight of 100 to 1000.

9. The controlled-release type fertilizer of claim 1, wherein the coating layer is a shell covering the granular fertilizer core and the additives are uniformly attached to the surface of the shell.

10. A method for preparing a controlled-release type fertilizer, comprising the steps of:
i) coating the surface of a granular fertilizer core with a coating composition comprising an olefin-based resin to form a first coating layer; and
ii) coating the first coating layer with liquid additives comprising a polyoxyethylene alkyl(-aryl)ether, wherein the polyoxyethylene alkyl(-aryl)ether includes hydrophilic groups in an amount of 30 to 70 wt %, based on the total weight of the polyoxyethylene alkyl(-aryl)ether, and
wherein the coating step ii) comprises adding the liquid additives in an amount of 0.001 wt % to 0.05 wt % based on the total weight of the controlled-release type fertilizer,
wherein the polyoxyethylene alkyl(-aryl)ether includes hydrophobic groups in an amount of 30 to 70 wt %, based on the total weight of polyoxyethylene alkyl(-aryl)ether, and
wherein the hydrophobic groups in the polyoxyethylene alkyl(-aryl)ether have a weight average molecular weight of 50 to 300.

11. The method of claim 10, wherein the first coating layer in step (i) is a shell covering the granular fertilizer core.

* * * * *